United States Patent
Hahn et al.

(10) Patent No.: US 7,994,922 B2
(45) Date of Patent: Aug. 9, 2011

(54) COMMUNICATIONS SYSTEM AND METHOD WITH A/D CONVERTER

(75) Inventors: Scott Hahn, Apple Valley, MN (US); Mark T. Van Horn, Boise, ID (US)

(73) Assignee: Round Rock Research, LLC, Mt. Kisco, NY (US)

( * ) Notice: Subject to any disclaimer, the term of this patent is extended or adjusted under 35 U.S.C. 154(b) by 998 days.

(21) Appl. No.: 11/855,788

(22) Filed: Sep. 14, 2007

(65) Prior Publication Data

US 2008/0048866 A1     Feb. 28, 2008

Related U.S. Application Data

(63) Continuation of application No. 10/893,112, filed on Jul. 16, 2004, now Pat. No. 7,327,263, which is a continuation of application No. 09/765,235, filed on Jan. 16, 2001, now Pat. No. 6,831,561, which is a continuation of application No. 09/249,287, filed on Feb. 10, 1999, now Pat. No. 6,198,392.

(51) Int. Cl.
    *G08B 13/14*     (2006.01)
(52) U.S. Cl. .................. 340/572.4; 340/572.1; 340/10.1
(58) Field of Classification Search .... 340/572.1–572.8, 340/442–447, 10.1–10.4; 73/146.5
See application file for complete search history.

(56) References Cited

U.S. PATENT DOCUMENTS

| | | | |
|---|---|---|---|
| 4,619,002 A | 10/1986 | Thro | |
| 5,019,815 A | 5/1991 | Lemelson et al. | |
| 5,184,349 A | 2/1993 | Riordan | |
| 5,446,447 A | 8/1995 | Carney | |
| 5,952,922 A | 9/1999 | Shober | |
| 5,988,510 A | 11/1999 | Tuttle et al. | |
| 6,046,676 A | 4/2000 | Ward et al. | |
| 6,075,973 A | 6/2000 | Greeff | |
| 6,084,530 A * | 7/2000 | Pidwerbetsky et al. ...... 340/10.1 |
| 6,087,930 A * | 7/2000 | Kulka et al. ................... 340/447 |
| 6,107,910 A * | 8/2000 | Nysen .......................... 340/10.1 |
| 6,130,602 A | 10/2000 | O'Toole et al. | |
| 6,137,422 A | 10/2000 | Hahn | |
| 6,198,392 B1 | 3/2001 | Hahn et al. | |
| 6,289,209 B1 | 9/2001 | Wood, Jr. | |
| 6,333,690 B1 | 12/2001 | Nelson et al. | |
| 6,831,561 B2 | 12/2004 | Hahn | |
| 7,327,263 B2 | 2/2008 | Hahn | |

OTHER PUBLICATIONS

MacNaull, Steve, "Identec Web Pages, high-Tech, Safe Food Delivery", Mar. 11, 1999.

(Continued)

*Primary Examiner* — Anh V La
(74) *Attorney, Agent, or Firm* — Lerner, David, Littenberg, Krumholz & Mentlik, LLP (57) ABSTRACT

A communications system includes a radio frequency identification device including an integrated circuit having a single die including a microprocessor, a receiver coupled to the microprocessor, and a backscatter transmitter coupled to the microprocessor, the integrated circuit having a digital input, and the receiver being configured to receive wireless communications from a remote interrogator; and an analog to digital converter external of the single die and having a digital output coupled to the digital input of the integrated circuit, and having an analog input configured to be coupled to an analog measuring device, wherein the radio frequency identification device is configured to transmit a signal indicative of the analog input using the backscatter transmitter. A communications method includes coupling an analog to digital converter to a radio frequency identification device.

50 Claims, 3 Drawing Sheets

OTHER PUBLICATIONS

Micron Communications, Inc. Data Sheets: "MicroStamp Engine SOIC", pp. 1 and 2, Feb. 20, 1998.

Linear Technology Data Sheets: LTC 1197/LTC 1197L/LTC 1199/LTC 1199L, pp. 1 and 2.

National Semiconductor Data Sheets: "MM54HC160/MM74HC160 Synchronous Decade Counter with Asynchronous Clear . . . ", pp. 3-142 and 3-143.

National Semiconductor Data Sheets: "MM54HC00/MM74HC00 Quad 2-Input NAND Gate", p. 3-3.

Motorola, Inc. Data Sheets: "Micropower Voltage Regulator", pp. 1 and 2, 1997.

Automatic ID News, "New Active RFID System Senses Temperature Reads from 30 Meters", Mar. 1999.

USPTO Transaction History of U.S. Appl. No. 09/249,287, filed Feb. 10, 1999, entitled "Communications System and Method with A/D Converter," now U.S. Patent No. 6,198,392.

USPTO Transaction History of U.S. Appl. No. 09/765,235, filed Jan. 16, 2001, entitled "Communications System and Method and A/D Converter," now U.S. Patent No. 6,831,561.

USPTO Transaction History of U.S. Appl. No. 10/893,112, filed Jul. 16, 2004, entitled "Communications Systems and Method with A/D Converter," now U.S. Patent No. 7,327,263.

* cited by examiner

FIG. 5

COMMUNICATIONS SYSTEM AND METHOD WITH A/D CONVERTER

CROSS REFERENCE TO RELATED APPLICATIONS

This patent application is a continuation of U.S. patent application Ser. No. 10/893,112, filed Jul. 16, 2004, now U.S. Pat. No. 7,327,263 entitled "Communications System and Method with A/D Converter", naming Scott Hahn and Mark T. Van Horn as inventors, which in turn is a continuation of U.S. patent application Ser. No. 09/765,235, filed Jan. 16, 2001, entitled "Communications System and Method with A/D Converter", naming Scott Hahn and Mark T. Van Horn as inventors, now U.S. Pat. No. 6,831,561, which in turn in a continuation of U.S. patent application Ser. No. 09/249,287, filed Feb. 10, 1999, entitled "Communications System and Method with A/D Converter", naming Scott Hahn and Mark T. Van Horn as inventors, which is now U.S. Pat. No. 6,198,392, the disclosures of which are incorporated by reference.

TECHNICAL FIELD

This invention relates to systems and methods for monitoring parameters and for remote data telemetry. The invention also relates to radio frequency identification devices.

BACKGROUND OF THE INVENTION

Electronic identification devices, such as radio frequency identification devices (RFIDs), are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another type of wireless electronic identification system is an active wireless electronic identification system. Attention is directed towards commonly assigned U.S. patent application Ser. No. 08/705,043, filed Aug. 29, 1996, now U.S. Pat. No. 6,130,602, and incorporated herein by reference, which describes such active systems in detail. One such system is sold by Micron Communications Inc., 3176 S. Denver Way, Boise, Id. 83705 under the trademark Microstamp Engine™. These systems include integrated circuit devices which include an active transponder and are intended to be affixed to an object to be monitored. The devices are capable of receiving and processing instructions transmitted by an interrogator. A device receives the instruction, if within range, then processes the instruction and transmits a response, if appropriate. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Because the Microstamp engine is capable of communications, it can be used for applications other than just inventory tracking and other typical RFID applications.

The Microstamp engine includes an internal A/D converter used for battery voltage sensing, but that A/D converter does not have an external input. A disadvantage of an internal A/D converter is that the user does not have the opportunity to use an A/D converter with more resolution than the internal A/D converter should the user be willing to pay extra for such resolution. Additionally, during the service life of a Microstamp engine, A/D converters may become available with higher resolution than the internal A/D converter.

SUMMARY

The invention provides a wireless identification device configured to provide a signal to identify the device in response to an interrogation signal. In addition, the invention provides coupling an analog to digital converter to the wireless identification device.

The invention also provides a communications system comprising a radio frequency identification device including an integrated circuit. The integrated circuit has a single die including a microprocessor, a receiver coupled to the microprocessor, and a backscatter transmitter coupled to the microprocessor. The integrated circuit also has a digital input. The receiver is configured to receive wireless communications from a remote interrogator. The communications system further includes an analog to digital converter external of the single die. The analog to digital converter has a digital output coupled to the digital input of the integrated circuit, and has an analog input configured to be coupled to an analog measuring device. The radio frequency identification device is configured to transmit a signal indicative of the analog input using the backscatter transmitter.

Other aspects and implementations are contemplated.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
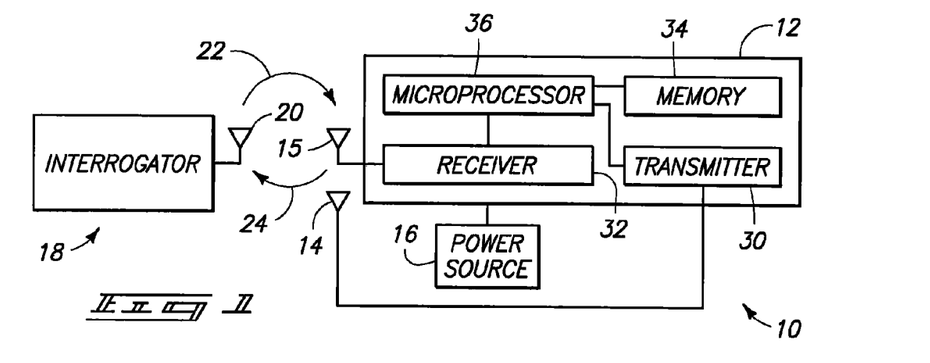
FIG. 1 is a high level circuit schematic showing an interrogator and a radio frequency identification device embodying the invention.

FIG. 1 illustrates a wireless identification device 10 in accordance with one embodiment of the invention. In the illustrated embodiment, the wireless identification device is a radio frequency data communication device 10, and includes RFID circuitry 12. The device 10 further includes an antenna 14 connected to the circuitry 12 for wireless or radio frequency transmission by the circuitry 12 and an antenna 15 coupled to the circuitry 12 for wireless or radio frequency reception by the circuitry 12. In one embodiment, the antennas 14 and 15 are microstrip antennas. In the illustrated embodiment, the RFID circuitry 12 is defined by an integrated circuit as described in the above-incorporated patent application Ser. No. 08/705,043, filed Aug. 29, 1996, now U.S. Pat. No. 6,130,602. Other embodiments are possible. A power source or supply 16 is connected to the integrated circuit 12 to supply power to the integrated circuit 12. In one embodiment, the power source 16 comprises a battery.

The device 10 transmits and receives radio frequency communications to and from an interrogator 18. An exemplary interrogator is described in commonly assigned U.S. patent application Ser. No. 08/907,689, filed Aug. 8, 1997, now U.S. Pat. No. 6,289,209, and incorporated herein by reference. Preferably, the interrogator 18 includes an antenna 20, as well as dedicated transmitting and receiving circuitry, complementary to that implemented on the integrated circuit 12.

Generally, the interrogator 18 transmits an interrogation signal or command 22 via the antenna 20. The device 10 receives the incoming interrogation signal via antenna 15. Upon receiving the signal 22, the device 10 responds by generating and transmitting a responsive signal or reply 24 via antenna 14. The responsive signal 24 typically includes information that uniquely identifies, or labels the particular device 12 that is transmitting, so as to identify any object or person with which the device 12 is associated.

Although only one device 10 is shown in FIG. 1, typically there will be multiple devices 10 that correspond with the interrogator 18, and the particular devices 10 that are in communication with the interrogator 18 will typically change over time. In the illustrated embodiment in FIG. 1, there is no communication between multiple devices 10. Instead, the devices 10 respectively communicate with the interrogator 18. Multiple devices 10 can be used in the same field of an interrogator 18 (i.e., within communications range of an interrogator 18).

The device 10 can be included in any appropriate housing or packaging. Various methods of manufacturing housings are described in commonly assigned U.S. patent application Ser. No. 08/800,037, filed Feb. 13, 1997, now U.S. Pat. No. 5,988,510, and incorporated herein by reference.

Figure 2:
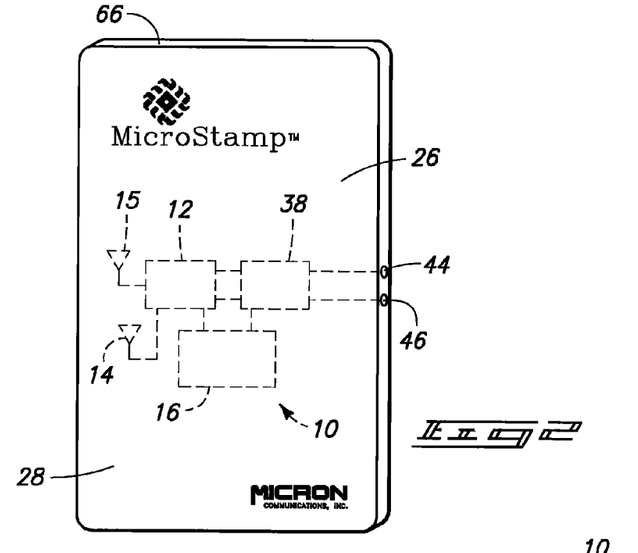
FIG. 2 is a front view of a housing, in the form of a badge or card, supporting the circuit of FIG. 1 according to one embodiment the invention.

FIG. 2 shows but one embodiment in the form of a card or badge 26 including a housing 28 of plastic or other suitable material supporting the device 10 and the power supply 16. In one embodiment, a face of the badge 26 has visual identification features such as graphics, text, information found on identification or credit cards, etc.

Figure 3:
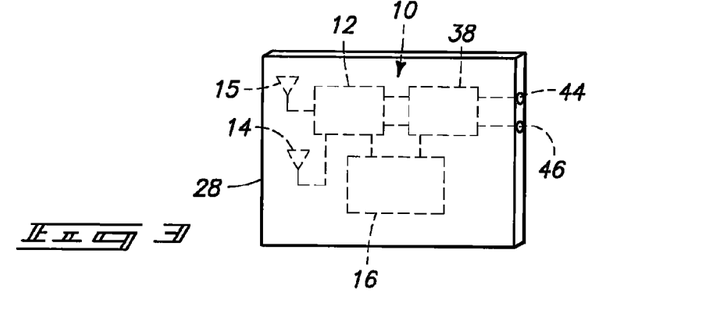
FIG. 3 is a front view of a housing supporting the circuit of FIG. 1 according to another embodiment of the invention.

FIG. 3 illustrates but one alternative housing supporting the device 10. More particularly, FIG. 3 shows a miniature housing 28 encasing the device 10 and power supply 16 to define a tag which can be supported by an object (e.g., hung from an object, affixed to an object, etc.). Although two particular types of housings have been disclosed, other forms of housings are employed in alternative embodiments.

If the power supply 16 is a battery, the battery can take any suitable form. Preferably, the battery type will be selected depending on weight, size, and life requirements for a particular application. In one embodiment, the battery 16 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 16 comprises a series connected pair of button type cells. In other alternative embodiments, other types of suitable power source are employed.

The circuitry 12 provides a responsive signal to the interrogator 18 by radio frequency. More particularly, the circuitry 12 comprises an integrated circuit including a single die having a backscatter transmitter 30, a receiver 32, a memory 34, and a microprocessor 36 coupled to the transmitter 30, receiver 32, and memory 34 (FIG. 1) as is described in U.S. patent application Ser. No. 08/705,043, filed Aug. 29, 1996, now U.S. Pat. No. 6,130,602.

Radio frequency identification has emerged as a viable and affordable alternative to tagging or labeling small to large quantities of items. The interrogator 18 communicates with the devices 10 via an electromagnetic link, such as via an RF link (e.g., at microwave frequencies, in one embodiment), so all transmissions by the interrogator 18 are heard simultaneously by all devices 10 within range.

Figure 4:
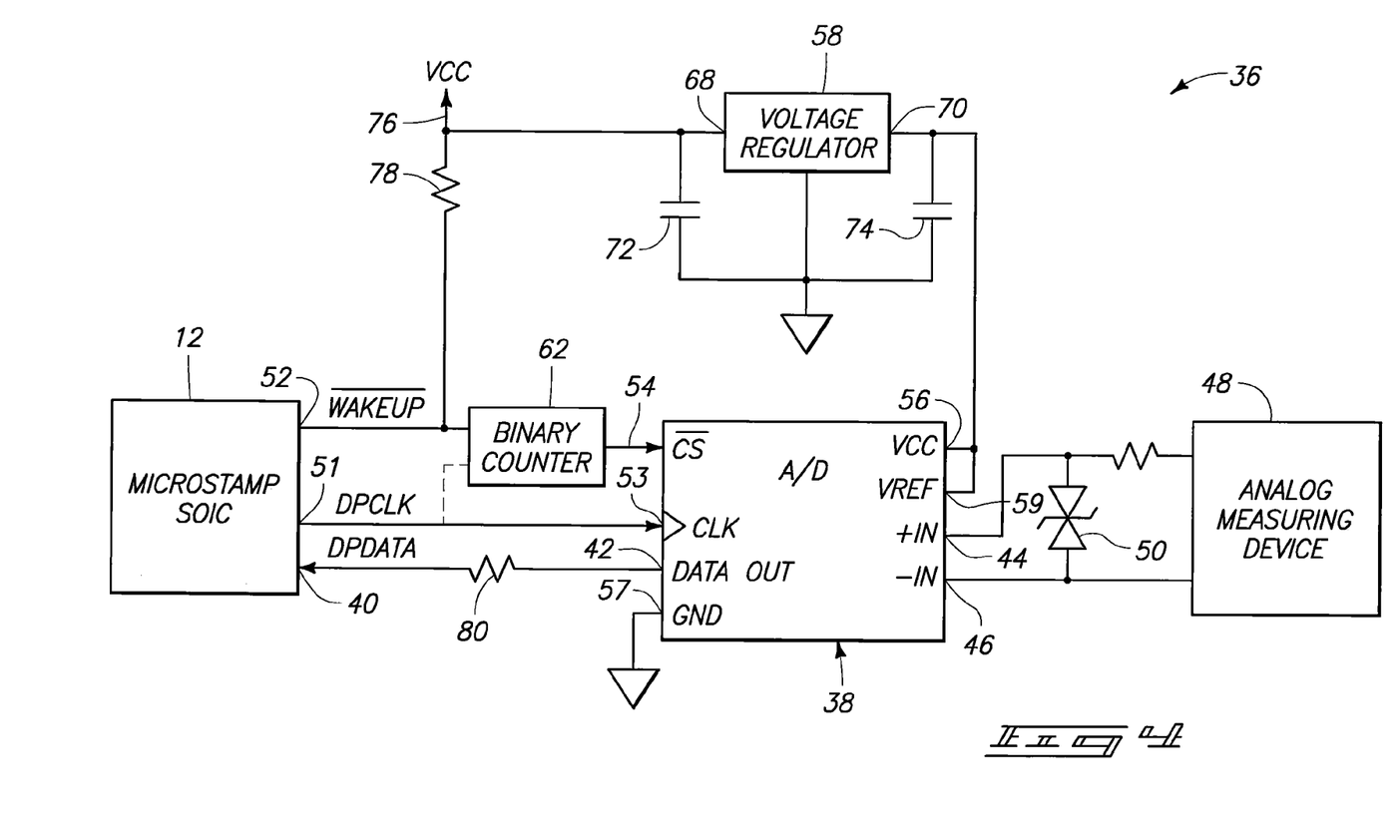
FIG. 4 is a circuit schematic of circuitry in accordance with one embodiment of the invention.

FIG. 4 illustrates a communications system 36 in accordance with one embodiment of the invention. The communications system 36 includes an analog to digital converter 38 coupled to the integrated circuit 12. The analog to digital converter 38 is external of the single die integrated circuit 12.

The integrated circuit 12 has a digital input 40. The analog to digital converter 38 has a digital output 42 coupled to the digital input 40 of the integrated circuit 12. The analog to digital converter 38 has first and second analog inputs 44 and 46 coupled to an analog measuring device 48 such as a temperature sensor, water level sensor, pressure sensor, or any other sensor that produces a voltage. The analog to digital converter 38 provides at its digital output 42 a signal indicative of the difference between first and second voltages applied to the first and second analog inputs 44 and 46.

The communications system 36 further comprises transient voltage protection circuitry 50 coupled between the analog inputs 44 and 46. The transient voltage protection circuitry 50 protects the analog inputs' maximum ratings from being exceeded. By using transient voltage protection circuitry 50, the effects of ESD (Electro-Static Discharge), voltage transients, and induced electrical noise (from the use of lengthy wire connections) can be reduced, and circuit performance can be enhanced.

The integrated circuit 12 further has a clock output 51, and the analog to digital converter 38 has a clock input 53 coupled to the clock output 51.

The analog to digital converter 38 further has a chip select input 54 which, when triggered, initiates an analog to digital conversion.

The integrated circuit 12 further has a wakeup output 52, coupled to the chip select input 54. A signal is produced at the wakeup output 52 to trigger the chip select input 54 in response to the receiver 32 (of FIG. 1) receiving a wireless communication. In response to the receiver 32 (of FIG. 1) receiving a read digital input command from the interrogator 18, the integrated circuit 12 (of FIG. 4) provides a signal at the wakeup output 52 and reads the digital input 40.

The analog to digital converter 38 transmits a signal indicative of the voltage differential at the analog inputs 44 and 46, using the backscatter transmitter 30 (of FIG. 1), in response to a read digital port command by the interrogator 18. More particularly, after the interrogator 18 transmits a read digital port command, the analog to digital converter initiates an analog to digital conversion of the difference in voltages at the analog inputs 44 and 46. The digital conversion is read by the integrated circuit 12 and transmitted using the backscatter transmitter 30.

The analog to digital converter 38 has a voltage supply input 56, a ground connector 57, and a reference voltage input 59. In one embodiment, the communications system 36 further comprises a voltage regulator 58 coupled to the reference voltage input 59 and to the voltage supply input 56. The voltage regulator 58 increases accuracy of the digital output by providing a stable voltage supply as well as decreased power consumption. In an alternative embodiment, the voltage regulator 58 is omitted.

In the illustrated embodiment, the integrated circuit 12 is a Microstamp Engine SOIC™ integrated circuit, part number MSEM256X10SG available from Micron Communications, 3176 S. Denver Way, Boise, Id. 83705, and has the following pin assignments (not shown): a pin 2 defines the wakeup output 52; a pin 18 defines the clock output 51; and a pin 17 defines the digital input 40. Also, in the illustrated embodiment, the analog to digital converter 38 is an analog to digital converter integrated circuit, part number LTC1197 available from Linear Technology Corporation, and has the following pin assignments: a pin 1 defines the chip select input 54; a pin 2 defines the analog input 44; a pin 3 defines the analog input 46; a pin 4 defines the ground connector 57; a pin 5 defines the reference voltage input 59; a pin 6 defines the digital output 42; a pin 7 defines the clock input 53; and a pin 8 defines the voltage supply input 56. Other analog to digital converters can be employed. Also, in one embodiment that includes the voltage regulator 58, the voltage regulator 58 is a Micropower Voltage Regulator™, part number MC78LC50 available from Motorola, and has the following pin assignments: a pin 1 defines a ground connector; a pin 2 defines an input 68; and a pin 3 defines an output 70 (FIG. 4). As shown in FIG. 4, a capacitor 72 is coupled between the input 68 and ground; and a capacitor 74 is coupled between the output 70 and ground. In the illustrated embodiment, the capacitors 72 and 74 respectively have values of 0.1 µF. The input 68 is coupled to a voltage supply 76 and a pull-up resistor 78 is coupled between the voltage supply 76 and the wakeup output 52. In the illustrated embodiment, the resistor 78 has a value of 100 kΩ. A resistor 80 is shown coupled between the digital output 42 and digital input 40. In the illustrated embodiment, the resistor 80 has a value of 10 kΩ. In the illustrated embodiment, the transient voltage suppressor 50 is a Transorb™ surge suppressor.

In one embodiment, the communications system 36 further includes a binary counter 62 coupled between the wakeup output 52 and the chip select input 54. The binary counter 62 causes the integrated circuit 12 to receive from the analog to digital converter 38 multiple conversions from analog to digital per trigger signal. In an alternative embodiment, the binary counter 62 is omitted and the wakeup output 52 is coupled to the chip select input 54.

Figure 5:
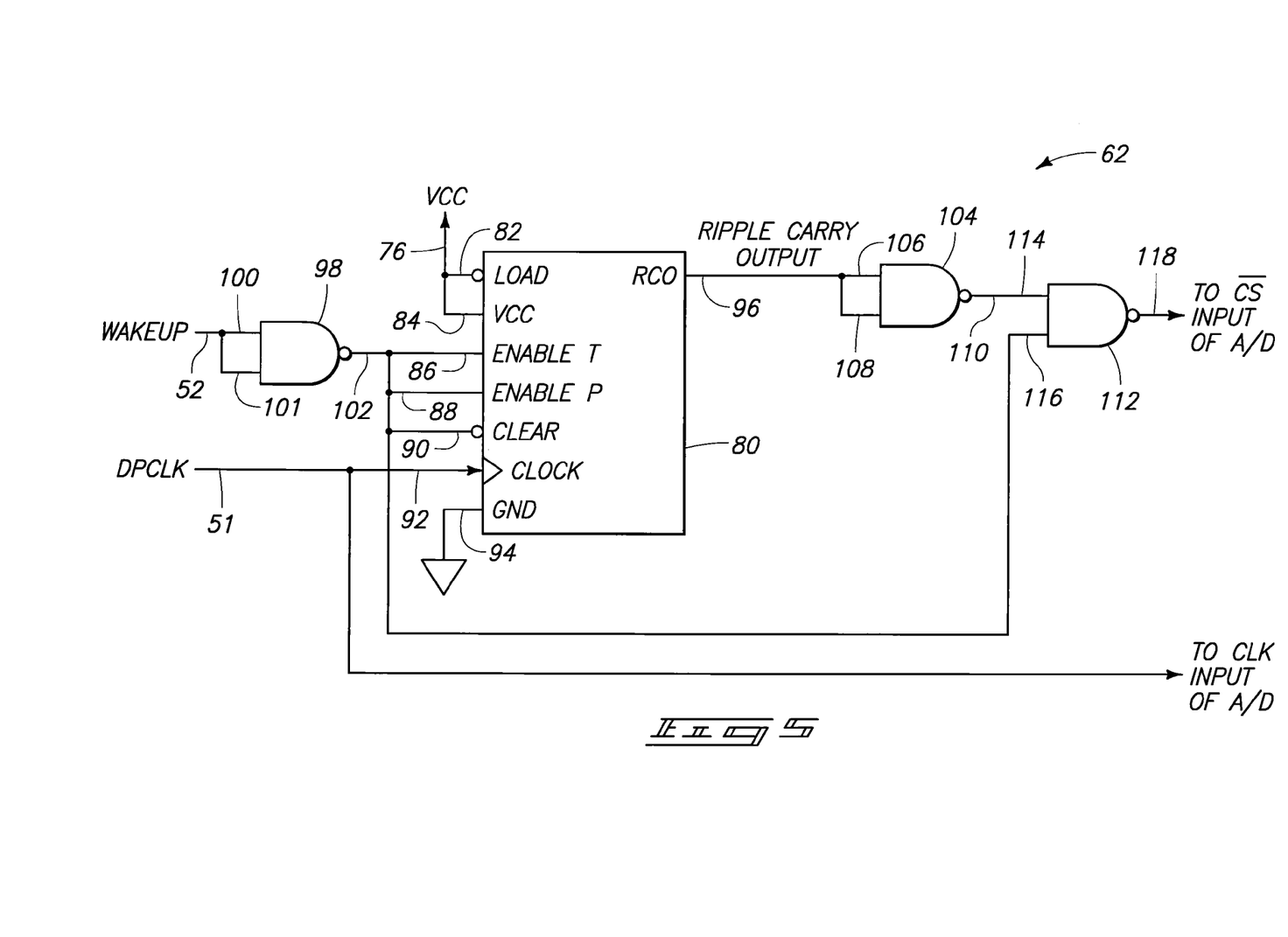
FIG. 5 is a circuit schematic of circuitry added to the circuitry of FIG. 4 in an alternative embodiment of the invention.

In embodiments where the binary counter 62 is employed, one circuit configuration that can be employed is shown in FIG. 5. Other alternatives are possible. The binary counter 62 shown in FIG. 5 includes an integrated circuit 80. The integrated circuit 80 includes a load input 82 and a VCC voltage supply input 84 coupled to the voltage supply 76, enable T and enable P inputs 86 and 88 (only one is used, however they are tied together so there is no pin which is floating), a clear input 90, a clock input 92 coupled to the clock output 51, a ground terminal 94 coupled to ground, and a ripple carry output 96. In the illustrated embodiment, the integrated circuit 80 is a synchronous binary counter with asynchronous clear, part number MM74HC161 available from National Semiconductor, and has the following pin assignments: a pin 1 defines the clear input 90; a pin 2 defines the clock input 92; a pin 7 defines the enable P input 88; a pin 8 defines the ground input 94; a pin 9 defines the load input 82; a pin 10 defines the enable T input 86; a pin 15 defines the ripple carry output 96, and a pin 16 defines the voltage supply input 84. Other integrated circuits could be employed.

The binary counter 62 further includes a NAND gate 98 having inputs 100 and 101 both coupled to the wakeup output 52 and having an output 102 coupled to the enable T input 86, the enable p input 88, and the clear input 90. The binary counter 62 further includes a NAND gate 104 having inputs 106 and 108 both coupled to the ripple carry output 96 and having an output 110. The binary counter 62 further includes a NAND gate 112 having an input 114 coupled to the output 110 of the NAND gate 104, having an input 116 coupled to the output 102 of the NAND gate 98, and having an output 118 coupled to the input 54 of the analog to digital converter 38. The clock output 51 is also coupled to the clock input 53 of the analog to digital converter 38 of FIG. 4 as it would be if the binary counter 62 were omitted. Also, if the binary counter 62 were omitted, the wakeup output 52 would be coupled directly to the chip select input 54 of the analog to digital converter 38. To save costs, instead of using inverters or some other variety of components, an integrated circuit having four NAND gates is used to define the NAND gates 98, 104, and 112. In the illustrated embodiment, the integrated circuit used to define the NAND gates 98, 104, and 112 is a MM74HC00 integrated circuit available from National Semiconductor.

By using the binary counter 62, thirty-two conversions from analog to digital are possible per RF command from the interrogator to read the digital port of the integrated circuit 12. Otherwise, there would only be one sample per RF command. With the thirty-two samples, averaging can be performed to obtain a more accurate reading. In the illustrated embodiment, every two bytes read by the integrated circuit 12 initiates a conversion stroke from analog to digital. With the binary counter 62, sixty-four bytes are available, resulting in thirty-two conversions.

Another aspect of the invention provides a method of manufacturing and using the communications system 36 (of FIG. 4). The method comprises supporting the monolithic semiconductor integrated circuit 12 from a substrate. The substrate can be a circuit board or other sheet capable of supporting integrated circuits thereon. In the illustrated embodiment, the substrate comprises a plastic sheet 66 that makes up a portion of the housing 28. Alternative substrates are possible (FIG. 2).

The microstrip antenna 15 (of FIG. 2) is supported from the substrate 66, external of the integrated circuit 12, and the microstrip antenna 15 is electrically coupled to the receiver 32. For example, in one embodiment, printed thick film is printed on the substrate to define the antenna 15 and intersects a pin on the integrated circuit 12 for electrical coupling to the receiver 32.

The microstrip antenna 14 is supported from the substrate 66, external of the integrated circuit 12, and the microstrip antenna 14 is electrically coupled to the transmitter 30. For example, in one embodiment, printed thick film is printed on the substrate to define the antenna 15 and intersects a pin on the integrated circuit 12 for electrical coupling to the receiver 32 as described in commonly assigned U.S. patent application Ser. No. 08/800,037, filed Feb. 13, 1997, now U.S. Pat. No. 5,988,510.

The battery 16 is supported from the substrate, and electrically coupled to the integrated circuit 12 to supply operating power to the integrated circuit 12.

The analog to digital converter 38 is coupled to the integrated circuit 12. In one embodiment, the analog to digital converter 38 is coupled to the integrated circuit 12, and the battery 16 is coupled to the integrated circuit substantially at the same time by mounting the analog to digital converter 38, battery 16, and integrated circuit 12 onto traces (e.g., printed thick film in one embodiment) drawn on the substrate 66 or circuit board. Assembly can take place in a manner similar to that disclosed in commonly assigned U.S. patent application Ser. No. 08/800,037, filed Feb. 13, 1997, now U.S. Pat. No. 5,988,510.

A digital signal indicative of the difference in magnitudes of the voltages at the analog inputs 44 and 46 is transmitted from the integrated circuit 12 to the interrogator 18 using the backscatter transmitter 30.

Thus, a communications system is provided where measurements from analog devices can be transmitted over a range longer than is possible with magnetic coupling by using an integrated circuit having a microprocessor, receiver, memory, and backscatter transmitter.

U.S. patent application Ser. No. 08/705,043, filed Aug. 29, 1996, now U.S. Pat. No. 6,130,602, is incorporated by reference above. The specification thereof describes a single die transceiver integrated circuit that has a temperature sensor, a voltage sensor, and an A/D converter. See, for example, col. 103, ln. 45-col. 104, ln. 7, which provides:

The integrated circuit 16 further includes a number of sensors, such as sensors "batalg," "tsn," and "mag," in the embodiments where an A/D converter is included in the analog processor "anlgproc." The sensor "batalg" is a battery voltage detector, the sensor "tsn" is a temperature sensor, and the sensor "mag" is a magnetic sensor. These sensors will be connected to the A/D converter in the analog processor "anlgproc" in one embodiment of the invention. In one embodiment, one or more of these sensors are not included or not used.

Using such sensors, the device 12 can monitor things such as its own battery voltage, its temperature and detect the presence of a magnetic field. There are various possible uses for information sensed by such sensors. For example, events can be counted so that, depending on the user's application, the user can determine whether or how many times a certain item was exposed to temperature above or below a certain value (e.g., to determine likelihood of spoilage or damage). Alternatively, the user can determine whether or how many times a certain item was exposed to a magnetic field of a certain value (e.g., when passing a certain location).

FIGS. 16AA-EH provide a circuit drawing showing construction details of the temperature sensor "tsn." The temperature sensor "tsn" was designed to put out a voltage that is linearly proportional to temperature. In the illustrated embodiment, the circuit "tsn" has been reconfigured for use as a low battery voltage detector.

FIGS. 16.01AA-DI provide a circuit drawing showing construction details of an operational amplifier "opamp" included in the temperature sensor "tsn."

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for remotely sensing, using radio frequency signals comprising:
   an interrogator operable for transmitting radio frequency signals and for receiving radio frequency signals and for communicating with remotely located radio frequency identification (RFID) tags via radio frequency signals within range of the interrogator; and
   a plurality of articles remote from the interrogator, each article having associated with it an RFID tag, each tag comprising:
   one or more antennas,
   a single monolithic integrated circuit having a digital input and comprising:
      a radio frequency signal receiver configured to receive a radio frequency interrogation signal transmitted from the interrogator,
      a radio frequency signal transmitter,
      a microprocessor, and
      a memory for persistent storage of data,
   an analog to digital converter comprising an analog input and a digital output coupled to the digital input of the integrated circuit,
   a power source operable to supply power, and
   a measuring device coupled to the analog input of the analog to digital converter, wherein the measuring device is configured to sense a physical characteristic selected from the group of temperature, pressure, water level, voltage, magnetic field and combinations thereof, wherein a signal indicative of the sensed physical characteristic is provided to the analog input of the analog to digital converter for conversion to the digital signal;
   wherein the interrogator receives radio frequency signals from one or more of the RFID tags including data indicative of a sensed physical characteristic including the digital signal from the analog to digital converter, in response to the transmitted radio frequency interrogation signal transmitted from the interrogator.

2. The system of claim 1, wherein for one or more of the RFID tags, the digital input of the single monolithic integrated circuit receives sense data indicative of the sensed physical characteristic.

3. The system of claim 2, wherein for one or more of the RFID tags, the analog to digital converter is a stand alone integrated circuit.

4. The system of claim 3, wherein for one or more of the RFID tags, the microprocessor is operable to store digital signals received from the analog to digital converter in the memory for later retrieval.

5. The system of claim 4, wherein for one or more of the RFID tags, the microprocessor is operable to retrieve the stored signals from the memory and to cause the transmitter to transmit a radio frequency signal including the retrieved stored signals, responsive to an interrogation message received by the radio frequency receiver.

6. The system of claim 4, wherein for one or more of the RFID tags, the microprocessor periodically stores data from the digital input into the memory for later retrieval.

7. The system of claim 1, wherein one or more of the RFID tags senses temperature.

8. The system of claim 7, wherein one or more of the RFID tags stores sensed temperature readings in the memory for later retrieval.

9. The system of claim 8, wherein for one or more of the RFID tags, the microprocessor determines whether the temperature reading received from the analog to digital converter is over a threshold.

10. The system of claim 9, wherein for one or more of the RFID tags, the microprocessor records additional data in the memory indicating when a temperature reading is over a threshold.

11. The system of claim 1, wherein for one or more of the RFID tags, the power supply is a passive power supply operable to supply power in the presence of radio frequency signals.

12. The system of claim 1, wherein one or more of the RFID tags communicates radio frequency signals by backscattering received radio frequency signals.

13. The system of claim 1, wherein one or more of the RFID tags transmits radio frequency signals actively.

14. The system of claim 1, wherein for one or more of the RFID tags, the power supply is a battery.

15. The system of claim 14, wherein one or more of the RFID tags communicates radio frequency signals by backscattering received radio frequency signals.

16. The system of claim 1, wherein for one or more of the RFID tags, the single monolithic integrated circuit additionally comprises an analog to digital converter coupled to the microprocessor.

17. The system of claim 1, wherein for one or more of the RFID tags, the memory further comprises unalterable indicia.

18. The system of claim 1, wherein for one or more of the RFID tags the memory is readable, writeable and re-writeable.

19. The system of claim 1, wherein for one or more of the RFID tags the memory is non-volatile.

20. The system of claim 1, wherein for one or more of the RFID tags the radio frequency receiver is operable to receive spread spectrum modulated signals.

21. The system of claim 1, wherein for one or more of the RFID tags the radio frequency transmitter is operable to communicate spread spectrum modulated signals.

22. The system of claim 14, wherein for one or more of the RFID tags the single monolithic integrated circuit further comprises a voltage sensor coupled to the battery.

23. The system of claim 1, wherein for one or more of the RFID tags, periodically the microprocessor receives digital data from the analog-to-digital converter that is indicative of a sensed characteristic from the measurement device and stores the data in the memory.

24. The system of claim 23, wherein for one or more of the RFID tags, and responsive to a received radio frequency signal that includes a command, the microprocessor retrieves stored data indicative of the sensed characteristic from the memory and subsequently configures the radio frequency transmitter to communicate the data using radio frequency signals.

25. A method for remote sensing characteristics of an article comprising:
providing an RFID tag affixed to the article, the RFID tag comprising:
a substrate,
one or more antennas disposed on the substrate,
a radio frequency transceiver circuit coupled to the one or more antennas comprising:
a single monolithic integrated circuit having a digital input and comprising a radio frequency receiver, a radio frequency transmitter, a microprocessor, a memory for persistent data storage,
a power supply coupled to the radio frequency transceiver circuit, and
a measuring device for sensing a physical characteristic selected from the group of temperature, pressure, water level, voltage and combinations thereof and outputting an analog signal indicative of the sensed characteristic, and
an analog-to-digital converter for receiving the analog signal from the measuring device at an analog input, converting the received signal to a digital signal, and outputting the digital signal to the radio frequency transceiver circuit via the digital input of the integrated circuit;
receiving a radio frequency signal including an interrogatory message in the radio frequency receiver;
collecting data from the digital signal resulting from the analog-to-digital converter converting voltages from the measuring device, wherein the collected data is indicative of the characteristic sensed by the measuring device; and
transmitting the collected data by communicating a radio frequency signal from the radio frequency transmitter to a radio frequency interrogator within range of the transmitter.

26. The method of claim 25 and further comprising:
providing the radio frequency interrogator configured to transmit radio frequency signals and to receive radio frequency signals and operable to communicate with RFID tags in remote proximity to the interrogator;
transmitting from the interrogator the radio frequency signal including the interrogatory message comprising a command to respond with the collected data; and
receiving a radio frequency signal from at least one RFID tag including the collected data.

27. The method of claim 25, wherein the sensed physical characteristic is temperature.

28. The method of claim 27, wherein the article is perishable.

29. A method for remotely determining the temperature of an article, comprising:
providing a radio frequency identification (RFID) device affixed to the article, the RFID device comprising:
a substrate,
one or more antennas disposed on the substrate,
a single monolithic integrated circuit having a digital input and comprising:
a radio frequency receiver coupled to the one or more antennas,
a radio frequency transmitter coupled to the one or more antennas,
a microprocessor, and
a memory coupled to the microprocessor,
a measuring device for sensing temperature coupled to the microprocessor via an analog to digital converter circuit, wherein the measuring device outputs an analog signal indicative of the sensed temperature to the analog to digital converter circuit, the analog to digital converter circuit converting the analog signal to a digital signal and outputting the digital signal to the integrated circuit via the digital input, and
a power supply;
receiving in the radio frequency receiver a radio frequency signal including an interrogatory message requesting transmission of data indicative of temperature sensed by the measuring device;
collecting digital data indicative of temperature sensed by the measuring device; and
transmitting a radio frequency signal from the radio frequency transmitter including the collected data.

30. The method of claim 29, wherein the article is perishable.

31. The method of claim 30, wherein the microprocessor is operable to periodically collect temperature data and store the data in the memory for later retrieval.

32. The method of claim 31 and further comprising providing a counter coupled to the microprocessor, wherein the microprocessor is operable to configure the counter responsive to a command received in the radio frequency signal receiver to contain a predetermined count, and further to collect the number of temperature samples equal to the predetermined count, and to store the digital data corresponding to the samples in the memory for retrieval.

33. The method of claim 32, wherein the microprocessor receives a command to transmit data as a portion of a radio frequency signal received in the radio frequency receiver and in response configures the memory to retrieve stored temperature data and configures the transmitter to communicate the stored data via radio frequency signals from the radio frequency transmitter.

34. A radio frequency identification (RFID) device for transmitting sensed conditions to a remote receiver, comprising:
a substrate;
one or more antennas disposed over the substrate;
radio frequency transceiver circuitry coupled to the one or more antennas and disposed adjacent the substrate, the radio frequency transceiver circuitry comprising a single monolithic integrated circuit comprising:
a digital input,
a radio frequency signal receiver,
a radio frequency transmitter for communicating radio frequency signals,
a memory for persistent storage of data, and
a microprocessor;
a power source for supplying power to the radio frequency transceiver circuitry;
a measuring device for measuring a condition and generating an analog signal indicative of the measured condition; and
an analog to digital converter coupled to the microprocessor, wherein the analog to digital converter is configured to receive the analog signal from the measuring device, convert the analog signal to a digital signal, and output the digital signal to the digital input of the integrated circuit.

35. The device of claim 34, wherein the analog signal is indicative of at least one condition selected from the group of temperature, pressure, magnetic field, voltage, water level and combinations thereof.

36. The device of claim 34, wherein the memory comprises memory that is readable, writeable and re-writeable.

37. The device of claim 34, wherein the memory comprises non-volatile memory.

38. The device of claim 34, wherein the memory further comprises a non-alterable indicia.

39. The device of claim 34 wherein the analog-to-digital converter is formed on the integrated circuit.

40. The device of claim 34, wherein responsive to a received command from a remote radio frequency interrogator received by the radio frequency receiver, the microprocessor inputs data from the analog to digital converter corresponding to the input signal and the microprocessor configures the radio frequency transmitter to communicate the data by communicating radio frequency signals.

41. The device of claim 34, wherein the radio frequency transmitter communicates radio frequency signals by backscatter reflection.

42. The device of claim 34, wherein the power source is a battery.

43. The device of claim 42, wherein the radio frequency transmitter actively transmits radio frequency signals.

44. The device of claim 40, wherein the single monolithic integrated circuit further comprises a counter, and responsive to a received command from a remote interrogator received by the radio frequency signal receiver, the microprocessor configures the memory to store a plurality of data samples corresponding to a count within the counter indicative of the input signal from the analog-to-digital converter over a predetermined time period, and the microprocessor configures the radio frequency transmitter to communicate the stored data samples using radio frequency signals.

45. A method for determining the temperature and pressure of an article remotely, comprising:
providing in the article a radio frequency identification (RFID) tag comprising:
a substrate,
one or more antennas disposed on the substrate,
a single monolithic integrated circuit comprising:
a radio frequency receiver coupled to the one or more antennas,
a radio frequency transmitter coupled to the one or more antennas,
a microprocessor, and
a memory coupled to the microprocessor for the persistent storage of data,
a measuring device for sensing temperature and outputting an analog temperature signal,
a measuring device for sensing pressure and outputting an analog pressure signal,
an analog to digital converter coupled to the microprocessor and configured to receive the analog temperature signal and the analog pressure signal, convert the analog temperature signal to a digital temperature signal, convert the analog pressure signal to a digital pressure signal, and output the digital temperature signal and the digital pressure signal to the integrated circuit, and
a power supply;
receiving in the radio frequency receiver a radio frequency signal including an interrogatory message requesting transmission of data indicative of at least one of the characteristics of temperature, pressure, and the combination thereof, sensed by the measuring devices;
collecting digital data indicative of the characteristic sensed by the measuring devices, wherein the digital data comprises at least one of the digital temperature signal and the digital pressure signal; and
transmitting a radio frequency signal from the radio frequency transmitter including the collected data.

46. The method of claim 45, wherein the article is non-perishable.

47. The method of claim 45 wherein the microprocessor is operable to periodically collect sensed characteristic data and store the data in the memory for later retrieval.

48. The method of claim 47 and further comprising providing a counter coupled to the microprocessor, wherein the microprocessor is operable to configure the counter responsive to a command received in the radio frequency signal receiver from an interrogator to contain a predetermined count, and further the microprocessor is operable to collect the number of data samples equal to the predetermined count, and to store the data corresponding to the samples in the memory for later retrieval.

49. The method of claim 48 wherein the microprocessor further receives a command from an interrogator to transmit data as a portion of a radio frequency signal received in the radio frequency receiver and in response configures the memory to retrieve the stored data and further configures the radio frequency transmitter to communicate the stored data via radio frequency signals from the radio frequency transmitter.

50. The method of claim 49, wherein configuring the transmitter further comprises communicating radio frequency signals by backscatter reflection.

* * * * *